UNITED STATES PATENT OFFICE.

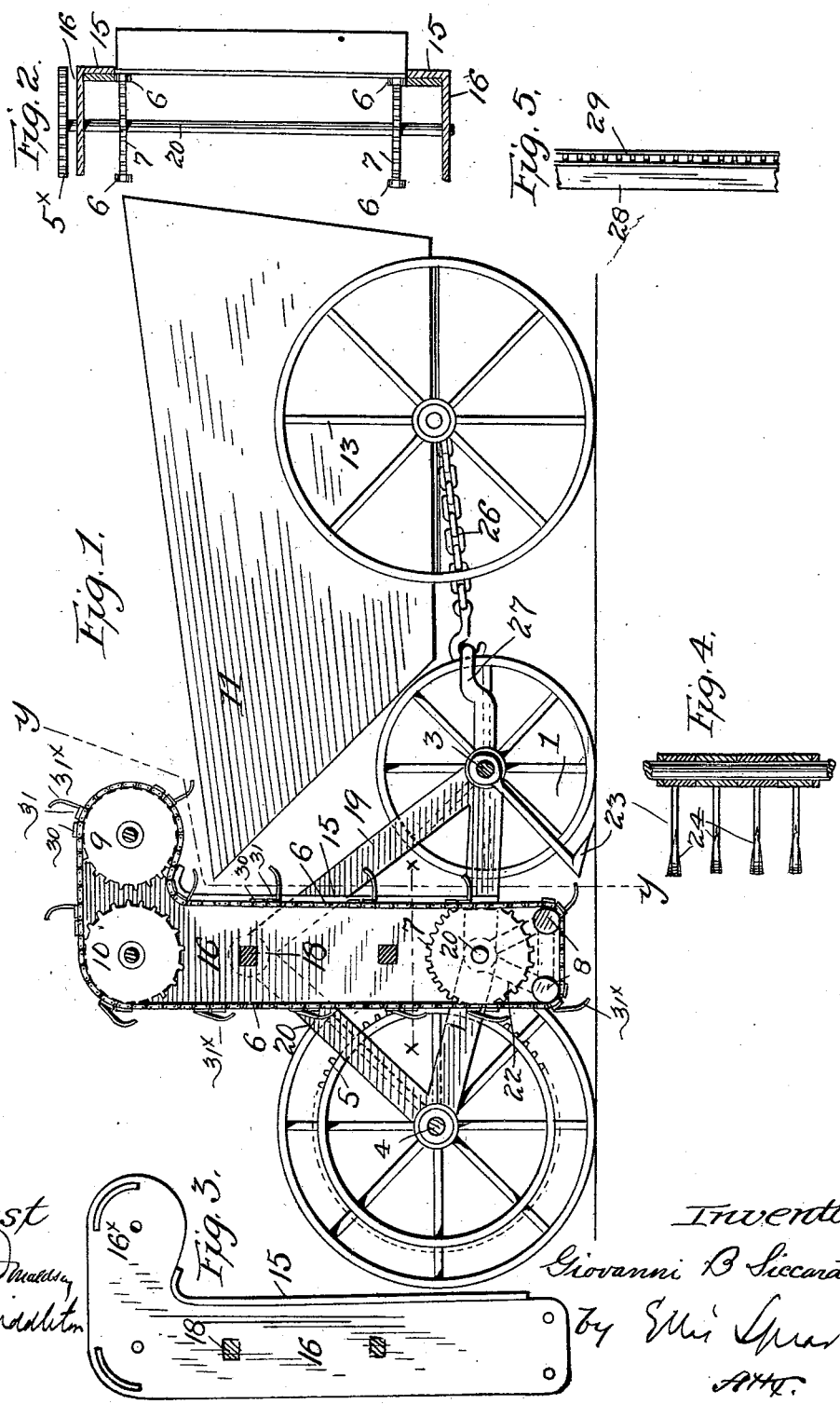

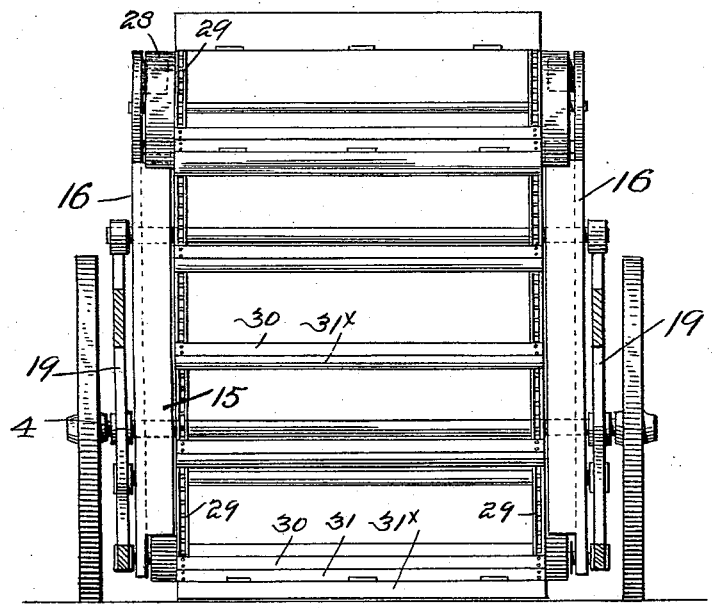

GIOVANNI B. SICCARDI, OF NEW YORK, N. Y.

SNOW-CLEANING MACHINE.

SPECIFICATION forming part of Letters Patent No. 542,209, dated July 2, 1895.

Application filed April 23, 1895. Serial No. 546,818. (No model.)

*To all whom it may concern:*

Be it known that I, GIOVANNI B. SICCARDI, a citizen of the United States, residing at New York, in the county of New York and State of New York, have invented certain new and useful Improvements in Snow-Cleaning Machines, of which the following is a specification, reference being had therein to the accompanying drawings.
The object of my invention is to provide a simple, efficient, and inexpensive machine for cleaning snow from streets and roadways, and my machine includes an endless elevating-chain carrying brackets designed to take the snow from the roadway and elevate and dump the same into an ordinary dump-cart, such as used in street-cleaning departments, said cart being attached to the front of the machine, being drawn over the roadway with the machine working in rear thereof, the endless chain of brackets operating to continually engage and elevate the snow and dump it into the cart.

My machine includes also a series of knives or plows operating in advance of the buckets and designed to break up the snow, so that the buckets may engage and elevate the same.

In the drawings, Figure 1 is a sectional elevation of the machine. Fig. 2 is a detail sectional view on line $xx$ of Fig. 1. Fig. 3 is a side view of one of the sides of the conveyer-frame, and Fig. 4 a detail view of the series of snow-knives. Fig. 5 is a detail of the conveyer-chains. Fig. 6 is a sectional view on line $yy$, Fig. 1.

The front and rear carrying-wheels 1 2 are of ordinary construction and are on axles 3 4. On the rear axle is the gear or spur wheel 5, and through this and the pinion $5^x$ the shaft 20 and sprocket-wheels 7 and the endless chain 6 are actuated, said chain passing vertically by the sprocket-wheel 7 and about the rollers 8 below the wheel 7, and thence up and laterally about the wheel 9, returning by way of the wheel 10. The wheel 9 is offset to such an extent as to overhang the tail end of the cart 11, and the belt in passing from its vertical position about the wheel 9 will dump the contents of the bucket at this horizontal or lateral position into the cart. This is of ordinary construction and has carrying-wheels 13. The rollers 8 are arranged at a slight distance apart and the belt or chain between them moves substantially horizontal. This gives a straight movement to the scoop or bucket for a definite distance and enables it to collect and firmly engage a sufficient quantity of snow.

In the upward course the belts or chains bear against guide plates or bars 15, extending vertically and having turned-over upper ends formed on a gradual curve, so as to gradually turn the chain laterally and about the wheel 9. These guide-bars serve to maintain the chain vertically and prevent it from sagging or vibrating under the weight from the load in the buckets or scoops. The upper toothed wheels, as well as the lower wheels, are carried in vertically-extending side plates 16, said plates having brace-bars 18 connecting them. Braces 19 20 extend, respectively, from the front and rear carrier-wheel axles to the side plates 16 and to the cross-bar 18 thereof, and braces extend also from said carrier-wheel axles to the axle of the sprocket-wheel 7. Braces 22 also connect the axles of the lower rollers 8.

In order that the snow may be broken up in advance of the buckets, knives or cutters 23, Figs. 1 and 4, are pivoted to the axle of the front carrying-wheel, and these have hooked cutting portions 24 to engage and cut the snow. These are free to rise and fall by gravity in passing obstructions. The cart has a sloping rear side extending over the front carrying-wheel of the main frame, and it will be noticed that this tail end is adapted to fit under the overhanging part of the conveyer-chain to receive the snow therefrom. The cart is connected with the machine by a chain 26, having a hook engaging the tongue 27 on the machine.

The form of the vertical side plates 16 is clearly shown in Fig. 3, they having the offset portions $16^x$, and they also have the guide-bars 15 extending inwardly from their front edges, as shown in Fig. 2. In this figure also and in Fig. 5 the form of the conveyer is shown, it comprising a belt 28 and a chain or link portion 29, connected thereto. The flexible belt portion bears on the guide-bars 15 for the purpose described, while the chain or link portions extend within the open space, and the buckets consist of two slats 30 31, forming the back thereof and attached to adjacent links of the chain, and a hinged and preferably curved bottom piece 31˟, the action of which is clearly shown at different parts of the carrier-chain in Fig. 1. This slatted form of bucket makes the same flexible and does not lessen the flexibility of the chain. The upper curved part of the side flanges 15 gives the chain a slight dip at the point of discharge, insuring the release of the snow and its proper discharge. Further, the hinged sections of the buckets being free to swing at this point aid in the discharge of the snow into the cart.

I claim—

1. A snow cleaning machine comprising the frame, the vertical side plates having offset portions, the guide roller therein, said plates having the guide bars 15 extending inwardly therefrom with curved upper ends, the conveyer chain and means for operating the conveyer chain and guiding the same vertically between the side plates, substantially as described.

2. A snow cleaning machine comprising the frame, the vertically extending side plates with offset upper portions and the guide rollers at said upper portions, the driving sprocket at the lower part of said side plates, the two guide rolls below the driving sprocket and on each side of the center thereof and the conveyer chain passing about the said rollers and engaging the driving sprocket, substantially as described.

3. In combination, the frame, the front and rear carrying wheels, the conveying chain, the support for the same extending vertically from between the wheels and the cutting knives arranged in front of the same and adapted to cut the snow, said knives being hung upon the axle of the front carrying wheels and inclining rearwardly therefrom, substantially as described.

4. A snow cleaning machine comprising the frame, the vertical side plates having the guide bars 15 extending inwardly therefrom, the guiding rollers and sprocket wheels, the conveyer chains made up of the links to engage the sprocket wheels and the flexible belt portion to engage the guide bars 15, the buckets carried by the conveyer chains and means for operating the chains, substantially as described.

In testimony whereof I affix my signature in presence of two witnesses.

GIOVANNI B. SICCARDI.

Witnesses:
WALTER DONALDSON,
HENRY E. COOPER.